Sept. 15, 1964    R. J. SCHULTZ ETAL    3,148,592
HYDRAULIC BRAKE BOOSTER
Filed May 27, 1963
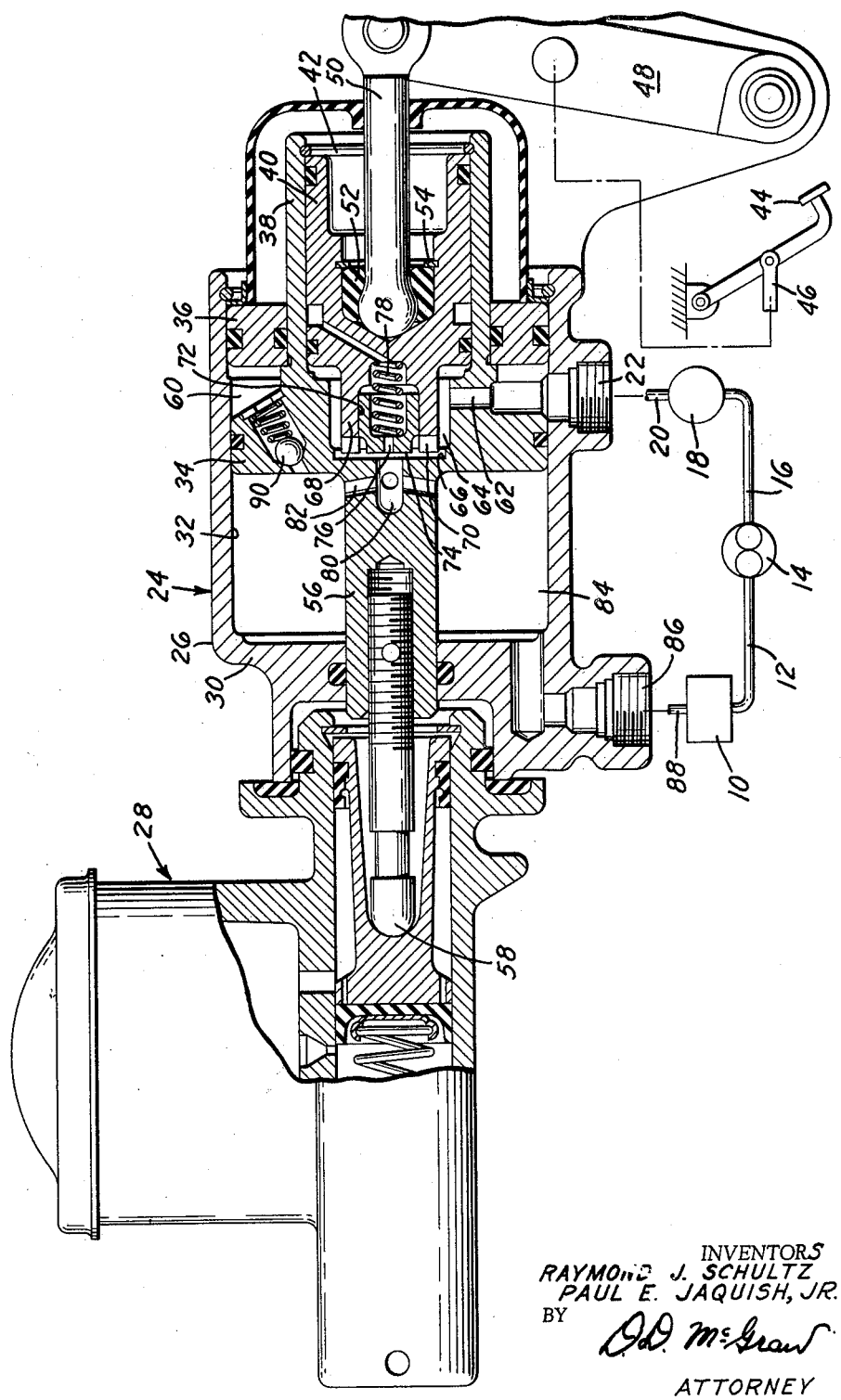
INVENTORS
RAYMOND J. SCHULTZ
PAUL E. JAQUISH, JR.
BY
O.D. McGraw
ATTORNEY 3,148,592
HYDRAULIC BRAKE BOOSTER
Raymond J. Schultz, Bay City, Mich., and Paul E. Jaquish, Jr., Santa Barbara, Calif., assignors to General Motors Corporation, Detroit, Mich., a corporation of Delaware
Filed May 27, 1963, Ser. No. 283,263
5 Claims. (Cl. 91—49)

The invention relates to a hydraulic brake booster of the open center type and more particularly to one in which a cylindrical face valve is reciprocably mounted and spring biased within a chamber of a valve actuator which is in turn mounted for controlled reciprocation in one end of the power booster assembly. This valve structure allows the cylindrical face valve head to act as a booster control valve and a pressure relief valve. The booster is preferably utilized in series with a suitable hydraulic system such as the power steering gear system, with the booster pressure inlet being attached to the downstream side of the steering system and the booster return port being connected to return fluid to the power steering pump reservoir.

In the drawing:

The figure is a cross section view of a booster embodying the invention and showing schematically the arrangement of the booster in a power steering gear system.

The power steering gear system includes a fluid reservoir 10 connected by conduit 12 to the power steering pump 14. Pressure from pump 14 is transmitted through conduit 16 to the power steering gear 18. The outlet of the power steering gear is transmitted by conduit 20 to the pressure inlet port 22 of the brake power booster unit 24.

Unit 24 includes the servo section 26 and the master cylinder section 28. The servo section housing 30 is formed to provide a cylinder 32 in which the booster piston 34 is reciprocably received. The rear end of cylinder 34 is sealed by the seal ring and piston stop member 36. Piston 34 has a rearwardly extending cylindrical portion 38 which is sealed to the inner annulus of ring 36 and contains a valve actuator 40 reciprocably mounted therein. A snap ring 42 is provided in the rear end of cylindrical portion 38 to provide a stop for actuator 40. The brake pedal 44 acts through links 46 and 48 on push rod 50 to move the actuator 40. Push rod 50 is retained in actuator 40 by retainer 52 and snap ring 54. Piston 34 has a forwardly extending portion 56 which passes through an end wall of the housing 30 in sealing relation and has the master cylinder push rod 58 secured to it for actuating the master cylinder assembly 28 to provide brake actuating pressure.

A boost pressure outer chamber 60 to which the pressure inlet port 22 is connected is provided by piston 34 and ring 36. A passage 62 connects outer chamber 60 with the boost pressure inner chamber 64 formed in piston 34. Chamber 34 is closed at its rear end by valve actuator 40 and at its forward end by the face 66 formed centrally of piston 34. Actuator 40 has a forwardly extending reduced section 68 extending within chamber 64 so that chamber 64 is essentially an annular chamber. The forward end of reduced section 68 is provided with castellations 70 so that when the actuator engages piston face 66, pressure in the inner chamber 64 is permitted to pass radially inward of the reduced section 68.

A valve cylinder 72 is provided in the actuator reduced section 68 and a face valve 74 is reciprocably mounted therein. The face valve 74 is engageable with the piston face 66 upon forward movement of the valve when the brake pedal is actuated. Valve 74 has a passage 76 therethrough and is urged to the outward position shown in FIGURE 1 by the pressure relief spring 78. Piston 34 is provided with a central passage 80 which extends from face 66 into the forwardly extending portion 56 of the piston. Radial passages 82 connect passage 80 with the low pressure chamber 84 on the forward side of piston 34 and within housing 30. The booster return port 86 is in fluid communication with chamber 84 and is connected to the power steering pump reservoir 10 by conduit 88.

In the normal condition of operation with the brakes released and the power steering pump 14 operating, fluid is pumped from reservoir 10 by pump 14 through the power steering gear 18, providing power for that gear as necessary, and then is delivered to the booster pressure inlet 22. The fluid then flows through outer chamber 60, passage 62 and inner chamber 64, past castellations 70, and between the piston face 66 and face valve 74 into passage 80. The fluid then passes through passages 82 and chamber 84 and is returned to the reservoir through return port 86 and conduit 88. When the brake pedal 44 is moved to actuate the brakes, push rod 50 moves valve actuator 40 and face valve 74 to the left, restricting flow between the piston face 66 and the forward reduced area end of valve 74. This causes a boost pressure to be built up in chambers 60 and 64 which is greater than the pressure in chamber 84, and piston 34 is moved to the left to actuate the master cylinder assembly 28 through push rod 58. Piston 34 continues to move until the restriction between the face 66 and the valve 74 is decreased until the forces acting on piston 34 are balanced, at which time the brake is in the poised position. Since pressure in the outer chamber 60 passes through the castellations 70 and acts on a small part of valve 74 surrounding the valve reduced area end even when the valve is in contact with face 66, this pressure acts on valve 74 so that the valve also functions as a pressure relief valve. Thus when the pressure in chambers 60 and 64 is sufficiently great, valve 74 moves to the right relative to actuator 40 against the force of spring 78, permitting some of the pressure to be released through passage 80, thus preventing a greater booster force than that desirable for vehicle brake operation.

Piston 34 is also provided with a check valve 90 which permits flow from chamber 84 to chamber 60 under certain conditions. If, for example, there is insufficient booster pressure available at inlet 22 to operate the booster, due to malfunctioning of the power steering pump 14, for example, the brake may still be manually applied without requiring the fluid contained in chamber 84 to be manually displaced through the return booster 86. If the pressure in chamber 84 under these conditions is somewhat greater than the pressure in chamber 60, valve 90 opens and the fluid flows from chamber 84 into chamber 60, thus providing a minimum resistance to the movement of piston 34 to the left in cylinder 32. Piston 34 can be moved to the left manually since the castellations 70 can engage the piston face 66 to transmit force directly through the booster to master cylinder assembly 28.

In the claims:

1. In a hydraulic brake booster having a source of dynamic hydraulic pressure and a power piston and open center valve means actuatable to restrict fluid flow to build up a pressure differential acting on said power piston, means including said valve means for limiting the pressure differential acting on said power piston and comprising, a valve seat, a manually displaceable member having a cylinder formed therein, a valve spool reciprocably received in said cylinder and having a valve element formed thereon movable with said manually displaceable member toward said valve seat to restrict fluid flow, and resilient spool engaging means urging said spool toward said valve seat in opposition to the pressure differential acting on said power piston and having a predetermined rate at which the power piston pressure differential tends to move said spool away from said valve seat to tend to increase fluid flow and thereby limit the power piston pressure differential.

2. The pressure differential limiting means of claim 1, the force exerted by the pressure differential in said valve spool in the valve opening direction being at least in part a reaction force transmitted through said manually displaceable means to provide brake booster feel.

3. The pressure differential limiting means of claim 2, said manually displaceable member including a pressure responsive means subject to the power piston pressure differential acting to move the power piston so as to provide additional reaction force for booster feel.

4. A fluid pressure differential actuated power servo comprising, a housing, pressure responsive means movably received in said housing and dividing said housing into a pressure input chamber and a pressure exhaust chamber, valve seat means formed on said pressure responsive means exposed to said pressure input chamber and a passage therethrough normally providing fluid communication between said pressure input and exhaust chambers, manually operated means in said cylinder forming a portion of the wall of said pressure input chamber and having a valve reciprocably received therein exposed to the pressure in said pressure input chamber and resilient means urging said valve toward said valve seat, said manually operated means when moved in a servo actuating direction moving said valve toward said valve seat means to restrict flow to said passage between said chambers to establish a fluid pressure in said pressure input chamber acting to move said pressure responsive means, said fluid pressure in said input chamber acting on said valve against said resilient means to move said valve at a predetermined pressure away from said valve seat to open said passage to limit the pressure in said pressure input chamber, said manually operated means and said valve providing a full reaction force in accordance with the pressure acting thereon in said pressure input chamber.

5. In an open center hydraulic power brake booster having a power wall through which hydraulic pressurized fluid flows when the booster is in the released position, a power wall face and a face valve for restricting flow through said power wall to cause a buildup of pressure to actuate the power wall, a valve actuator reciprocably receiving said face valve, and a pressure relief spring between said face valve and said actuator whereby boost pressure buildup by valve restriction action acts against a predetermined area of said face valve to compress said spring at a predetermined boost pressure and reduce the restrictive effect of said valve and said power wall face to limit the booster pressure obtainable.

References Cited in the file of this patent

UNITED STATES PATENTS 2,957,311    Stelzer _____ Oct. 25, 1960